United States Patent
Greaves et al.

(10) Patent No.: US 7,772,160 B2
(45) Date of Patent: *Aug. 10, 2010

(54) METHOD FOR CONTROLLED PLACEMENT OF ADDITIVES IN OIL AND GAS PRODUCTION

(75) Inventors: Michael Greaves, Houston, TX (US); Steven Jeremy Weghorn, Missouri City, TX (US); Hani S. Zaki, Calgary (CA)

(73) Assignee: Baker Hughes Incorporated, Houston, TX (US)

( * ) Notice: Subject to any disclaimer, the term of this patent is extended or adjusted under 35 U.S.C. 154(b) by 194 days.

This patent is subject to a terminal disclaimer.

(21) Appl. No.: 11/848,024

(22) Filed: Aug. 30, 2007

(65) Prior Publication Data

US 2008/0058226 A1    Mar. 6, 2008

Related U.S. Application Data

(60) Provisional application No. 60/842,613, filed on Sep. 6, 2006.

(51) Int. Cl.
*C04B 33/04*    (2006.01)
*C09K 8/64*    (2006.01)
*C09K 8/523*    (2006.01)
*C09K 8/60*    (2006.01)

(52) U.S. Cl. .................. 507/90; 507/232; 507/239; 507/242

(58) Field of Classification Search .................. 507/90, 507/232, 239, 242
See application file for complete search history.

(56) References Cited

U.S. PATENT DOCUMENTS

| | | | |
|---|---|---|---|
| 2,836,555 A | 5/1958 | Armentrout | 252/8.5 |
| 3,676,363 A | 7/1972 | Mosier | 252/316 |
| 3,756,949 A | 9/1973 | Schreurs | 252/8.55 B |
| 4,192,753 A | 3/1980 | Pye et al. | 252/8.5 A |
| 4,588,640 A | 5/1986 | Matlach | 428/407 |
| 4,659,334 A | 4/1987 | Matlach | 44/51 |
| 4,905,762 A | 3/1990 | Zilch | 166/310 |
| 4,986,354 A | 1/1991 | Cantu et al. | 166/279 |
| 5,027,901 A | 7/1991 | French et al. | 166/310 |
| 5,753,596 A | 5/1998 | Martin et al. | 507/237 |
| 5,922,652 A | 7/1999 | Kowalski et al. | 507/129 |
| 6,054,415 A | 4/2000 | Gee et al. | |
| 6,126,872 A | 10/2000 | Kommareddi et al. | 264/4.1 |
| 6,160,036 A | 12/2000 | Kommareddi et al. | 523/175 |
| 6,270,653 B1 | 8/2001 | Gochin et al. | 208/44 |
| 6,326,335 B1 | 12/2001 | Kowalski et al. | 507/241 |
| 6,326,336 B1 | 12/2001 | Gatto et al. | 508/290 |
| 6,379,612 B1 | 4/2002 | Reizer et al. | 422/7 |
| 6,380,136 B1 | 4/2002 | Bates et al. | 507/90 |
| 2003/0209348 A1 | 11/2003 | Ward et al. | |
| 2004/0043906 A1 | 3/2004 | Heath et al. | 507/200 |
| 2004/0110645 A1 | 6/2004 | Campbell | |

*Primary Examiner*—Timothy J. Kugel
*Assistant Examiner*—Atnaf Admasu
(74) *Attorney, Agent, or Firm*—Mossman, Kumar & Tyler, PC

(57) ABSTRACT

Pellets can be injected into oil and gas production equipment that may contain stagnant or slow moving system fluids to treat the stagnant or slow moving system fluids to prevent conditions such as corrosion. The pellets have a density such that they may be moved through the equipment by system fluids passing therethrough. When the pellets come into contact with the stagnant or slow moving system fluids, sufficient pellets enter the stagnant or slow moving system fluids to treat it. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or meaning of the claims.

20 Claims, 1 Drawing Sheet

METHOD FOR CONTROLLED PLACEMENT OF ADDITIVES IN OIL AND GAS PRODUCTION

CROSS REFERENCE TO RELATED APPLICATIONS

This Application claims priority from the U.S. Provisional Patent Application of the same title and inventorship and having the Ser. No. 60/842,613; which was filed on Sep. 6, 2006.

BACKGROUND OF THE INVENTION

1. Field of the Invention

This invention relates to a method for treating pipelines, flow lines, and other equipment used in the production of oil and gas with chemicals useful for reducing corrosion, scale, asphaltenes and other undesirable conditions. This invention particularly relates to a method for the controlled placement of such chemicals and the controlled release of these chemicals.

2. Background of the Art

Fluids produced from oil wells penetrating an oil-bearing formation primarily include crude oil and water and are herein referred to as system fluids. A system fluid may also contain natural gas which may or may not be desirable and may be the primary product of a given well in which case the well is referred to as a gas well. A system fluid may also contain $CO_2$ and will often contain oil and water insoluble compounds such as clay, silica, waxes, and asphaltenes, which exist as colloidal suspensions. In addition to the already listed components, system fluids can also include inorganic components that can precipitate to form mineral scales. These materials may be undesirable in the exploration for and production of oil and gas.

It is known in the art of oil and gas production to eliminate or mitigate the effects these undesirable materials. For example, during oil and gas production in production wells, the drilling of new wells, or workovers of existing wells, many chemicals, referred herein as "additives;" which include scale inhibitors, paraffin inhibitors, corrosion inhibitors and the like; are often injected from a surface source into the wells to treat the system fluids flowing through such wells to prevent or control the precipitation of mineral scale and/or paraffins, and to protect the well against corrosion. These additives can be injected continuously or by batches through a conduit or tubing that is run from the surface to a known depth within the formation, typically upstream of the problem location.

In addition, an additive can be injected into a near wellbore formation via a technique commonly referred to as "squeeze" treatment, from which the additive can be slowly released into the system fluid. Sometimes, additives are introduced in connection with electrical submersible pumps, or through an auxiliary line associated with a cable used with the electrical submersible pump. In addition, in wells without a packer, additives may be applied via pump or truck into the annular space between the tubing and the casing with a fluid flush driving the additive into the system fluids.

In most of these operations, the additives are in the form of aqueous-eternal micro-emulsions or admixtures, although organic solutions are also known. The use of liquid additives is not without problems. In cold weather, the additives may freeze or gel during transportation or use. Supplying a source of heat, particularly for remote well sites can be a problem.

One issue that sometimes arises in treating oil and gas exploration and production equipment is in getting the additives to the location where they are most needed. It does not do any good to treat formation fluid in an oil well to, for example, prevent corrosion, if the corrosion that was a problem actually was occurring in locations upstream from the oil well. It would be particularly desirable in the art of treating oil and gas production equipment with additives to locate the additives at the point within the oil and gas production equipment that requires the treatment for which the additives are used.

SUMMARY OF THE INVENTION

In one aspect, the present invention is a method for treating oil field exploration and production equipment containing stagnant or slow moving system fluid with an additive comprising introducing into system fluid a pellet incorporating the additive and having a density greater than that of the system fluid and about the same as the stagnant or slow moving system fluid wherein the pellet is introduced into the system fluid at a point upstream of the location of the stagnant or slow moving fluid.

In another aspect, the invention is A method for treating oil field exploration and production equipment containing stagnant or slow moving system fluid and a system fluid passing therethrough with an additive, the method comprising: (a) preparing intermediate pellets containing a first additive and having a first density; and) b) coating the intermediate pellets with an admixture of a second additive and a weighting agent as a coating to form a laminate pellet having a second density, and (c) introducing the laminate pellets into a system fluid upstream from the stagnant or slow moving fluid; wherein the coating first dissolves thereby treating the system fluid with the second additive and the intermediate pellets then are swept through the oil field exploration and production equipment to the stagnant or slow moving system fluid and release the first additive thereby treating the stagnant or slow moving fluid.

In still another aspect, the invention is a method for treating oil field exploration and production equipment containing stagnant or slow moving system fluid with an additive, the method comprising introducing into system fluid passing through the oil field exploration and production equipment pellets incorporating the additive and having a density greater than that of the system fluid and about the same as the stagnant or slow moving system fluid, wherein the pellets are introduced into the system fluid at a point upstream of the location of the stagnant or slow moving fluid and further comprising determining the density of the stagnant or slow moving system fluid and preparing the pellets using the density of the stagnant or slow moving system fluid to select the density of the pellets.

BRIEF DESCRIPTION OF THE DRAWINGS

For a detailed understanding and better appreciation of the present invention, reference should be made to the following detailed description of the invention and the preferred embodiments, taken in conjunction with the accompanying drawings wherein.

DETAILED DESCRIPTION OF THE PREFERRED EMBODIMENT

Figure 1:
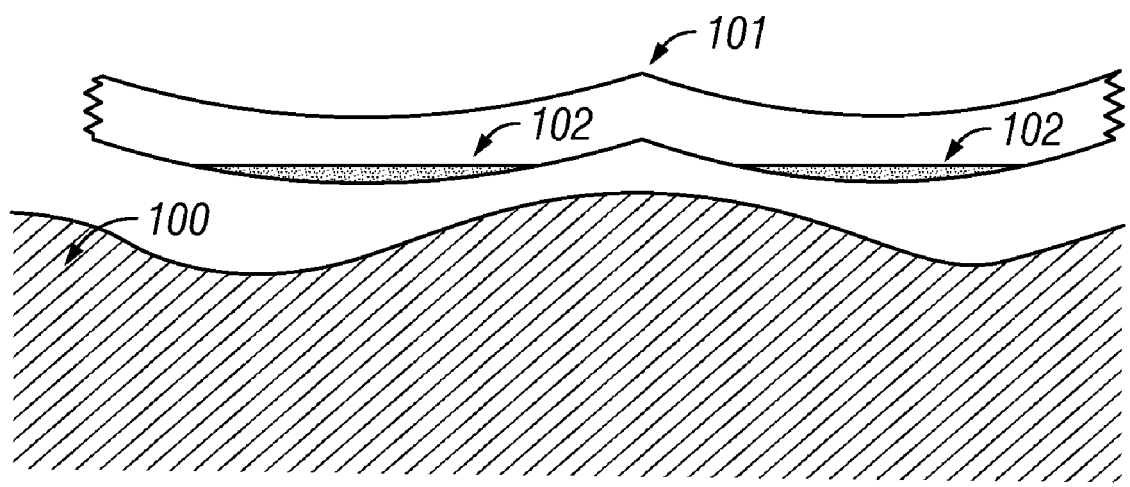
FIG. 1 is diagram of a flow line at the bottom of a body of water.

In one embodiment, the present invention is a method for treating oil field exploration and production equipment containing stagnant or slow moving system fluid. For the purposes of this application, such equipment includes pipelines, flowlines and any other equipment that has system fluid passing through it and may additionally contain standing (stagnant) or slow moving transitory system fluids having a density greater than that of the system fluid. In FIG. 1, a flowline (101) is shown running along the bottom of a body of water (100). In the flow line are two bodies of standing system fluid (102).

In some embodiments of the invention, the stagnant or slow moving system fluid will be water, often a brine. In other embodiments of the invention, the stagnant or slow moving system fluid may be a heavy hydrocarbon. In all embodiments, there will be a continuous or intermittent flow of a system fluid that passes over the stagnant or slow moving system fluid.

In one embodiment of the present invention, a pellet including a corrosion inhibitor is used to treat a flowline to protect it from corrosion. While corrosion can occur anywhere in the flowline in contact with system fluid, even that where the system fluid consists primarily of hydrocarbons, corrosion usually will occur more rapidly where the flowline is in contact with system fluid having a higher water content. It is an element of the invention then that the pellets including the additives have a density that is greater than that of the system fluid, but not so dense that they cannot be moved or carried by the system fluid. Desirably, the pellets will have a density about the same as or slightly greater than the stagnant or slow moving system fluid. This will allow for the pellets to be swept to the stagnant or slow moving system fluid by the system fluid with some or all of the pellets being retained in the stagnant or slow moving system fluid.

In the practice of one embodiment of the invention, the densities of both the system fluid and the stagnant or slow moving system fluid would be known or determined using conventional testing and modeling methods well known to those of ordinary skill in the art of producing oil and gas to be useful. Once the density of the system fluid and the stagnant or slow moving system fluid is known, an appropriate density for the pellet is selected. The pellet is the prepared by admixing at least one additive, the pellet matrix, and sufficient weighting material to produce a pellet having the desired density. In the practice of the method of the present invention, the pellets useful with the method may have a density of from about 0.6 to about 1.3, a density of from about 0.75 to about 1.2, or a density of from about 0.9 to about 1.1. The pellet density, in one embodiment, may be set by adjusting the density of a pellet containing the additive using a weighting agent. The weighting agent can be any material having a density different than the active additive and that can be dispersed within a pellet useful with the present invention. A weighting agent may increase or decrease the effective density of the pellet. The weighting agent may be selected from the group consisting of inorganic salts that are sparingly soluble in system fluids such as calcium sulphate, magnesium sulphate, calcium carbonate, titanium oxide, aluminum oxide, potassium chloride, sodium chloride, and mixtures thereof.

The pellets have a pellet matrix and dispersed uniformly within the matrix are the weighting agent and additive. The pellets useful with the method of the present invention can be formed by any process known to those of ordinary skill in the art to be useful. For example, in one embodiment, the pellets are prepared in a pellet mill by forcing an admixture of additive, weighting agent and pellet matrix through a die under pressure pursuant to known processes using known machines. The pellets may have a major cross-sectional dimension that is greater than 0.2 mm but less than 1.5 mm. The pellets may be cut to particular desired lengths as extruded, but may also be allowed to break randomly to provide a pelletized product averaging between 0.5 mm and 1.0 mm in length.

In another embodiment, the pellets useful with the present invention are formed using a prilling process. In a prilling process, the admixture of weighting agent, additive and pellet matrix are spayed into a refrigerated cylinder and allowed to coalesce and form a pellet while in free-fall. Other means of preparing the pellets useful with the present invention include crystallization, precipitation, pan-coating, fluid-bed coating, fluid bed agglomeration, rotary atomization, extrusion, spheronization, drum granulation and high shear agglomeration, but any method capable of producing the pellets having utility with the method of the present invention can be used.

Additives useful with the method of the present invention include those used to prevent or mitigate the formation of scale, paraffins, asphaltenes, and emulsions. Other additives useful for preventing or mitigating the occurrence of corrosion, and foaming can also be used with the method of the present invention.

When the additives used with the method of the present invention are corrosion inhibitors, they may be selected from the group consisting of carboxylic acids and derivatives such as aliphatic fatty acid derivatives, imidazolines and derivatives; including amides, quaternary ammonium salts, rosin derivatives, amines, pyridine compounds, trithione compounds, heterocyclic sulfur compounds, alkyl mercaptans, quinoline compounds, or salts, quats, or polymers of any of these, and mixtures thereof. For example, suitable inhibitors include primary, secondary, and tertiary monoamines; diamines; amides; polyethoxylated amines, diamines or amides; salts of such materials; and amphoteric compounds. Still other examples include imidazolines having both straight and branched alkyl chains, phosphate esters, and sulfur containing compounds. For the purposes of this application and in reference to corrosion inhibitors, the term polymers means any polymer, copolymer or compound having polymerized chains that incorporate the functional groups specified to inhibit corrosion.

Another additive useful with the present invention is a paraffin inhibitor. Dispersants that act as solubilizing agents for paraffin, e.g., nonionic and anionic surfactants can also be used with the present invention. Paraffin inhibitors can also be long chain polymers and/or surface-active materials. Any paraffin inhibitor useful known to be useful to those of ordinary skill in the art can be used with the present invention.

Still another additive that can be used with the method of the present invention is an asphaltene inhibitor. Suitable asphaltene treatment chemicals include those such as alkylphenol ethoxylates and aliphatic polyethers.

Another additive that can be used with the present invention includes the scale inhibitors. Scale Inhibitors that can be used with the method of the present invention include phosphate esters, polyacrylates, phosphonates, polyacrylamides, and polysulfonated polycarboxylates.

The pellets useful with the present invention are prepared using a pellet matrix. The pellet matrix is the continuous phase within which the additive and weighting agent are uniformly dispersed. In one embodiment of the invention, a pellet matrix useful with the present invention functions to slowly release the additive.

Pellet matrices useful with the present invention are any which have the qualities set forth immediately above. Preferred pellet matrices useful with the present invention include, but are not limited to: linear alcohols, waxes, ethoxylates, sugars, ureas, starches, and mixtures thereof. In some embodiments, the pellet matrices used to prepare the pellets useful with the method of the present invention are synthetic paraffin waxes.

In addition to the embodiments already described, the present invention also includes certain other pellets with additional properties. For example, in one embodiment, the present invention is a pellet useful for delivering at least one additive to two locations within a flowline or pipeline. In this embodiment, a first pellet is prepared which has a relatively low density. This pellet is then coated with a second layer of pellet matrix, additive and weighting agent having a higher density. In this embodiment, the pellet could be used to first treat a stagnant or slow moving fluid and then to treat the formation fluid as the density of the pellet decreases and it leaves the stagnant or slow moving fluid. Other embodiments are also possible, including one were there are two separate additives, the first being a relatively dense additive which is quickly released and second additive which is released more slowly, the pellet losing density as the first, heavier additive is released.

In addition to the embodiments already described, the present invention also includes admixtures of pellets. For example, one pellet may contain a corrosion inhibiting additive and a second pellet may contain a foaming agent for the removal of water. The method of the invention may be practiced with a mixture of the two pellets delivered at one time. Any number or combination of different pellets may be delivered in one application according to the method of the present invention.

The additives of the present invention are desirably slow release additives. In the practice of the method of the present invention, the rate of release of the additives from the pellets may be controlled by varying the size of the pellets themselves. In another embodiment varying the chemical composition of the pellet matrix controls the rate of release. While not wishing to be bound by any theory, it is believed that the release rate is a function of pellet size. The larger the pellet size, the smaller the surface area relative to the pellet volume. In two pellets having the same additive loading, the pellets with the larger size will release their additive more slowly than the pellets with smaller size. By controlling shear rate when the pellet matrix and additive are admixed, the rate of release is controlled to be from about one month to one year, in some embodiments from about two months to about ten months, and in other embodiments from about two months to about six months.

The rate of release of additives from the pellets useful with the present invention can vary according to the type of additive and pellet matrix selected to prepare the pellets. The pellets of the present invention may be used to release additive at a rate of from about 5 to about 500 parts per million of system fluid being produced from an oil and gas well with the value being the concentration required to obtain the desired result and performance from the chemical additive. The pellets will release at a fixed rate based upon the size of the pellet, so the dosage for a given well can be adjusted.

The method of the present invention is practiced by introducing additives to a system fluid in the form of a pellet. In one embodiment, the pellets may be suspended in a liquid and pumped into the annulus between the well casing and the production tubing. In the alternative, the pellets can be poured, washed or otherwise transported into the annulus. In still another embodiment, the pellets are introduced directly into the equipment to be treated at a point immediately upstream from the location of the stagnant or slow moving fluids.

In the method of the present invention, a pellet is used to introduce additives into a stagnant or slow moving fluid by introducing the pellets into a formation fluid and allowing the system fluid to carry or move the pellets to the stagnant or slow moving fluid. The pellets can be suspended as long as there is sufficient turbulence in the flow of system fluid that sufficient pellets are brought into contact with the stagnant or slow moving system fluid. In one preferred embodiment, the pellets have a density such that they are moved along the bottom of a flowline by the system fluid. In this application, the pellets are sufficiently dense that when they arrive at the stagnant or slow moving system fluid, they float on or sink into the stagnant or slow moving system fluid to release their additive and treat the stagnant or slow moving system fluid. In a similar embodiment, the pellets do not release their additive until they are in contact with the stagnant or slow moving system fluid.

EXAMPLES

The following examples are provided to illustrate the present invention. The examples are not intended to limit the scope of the present invention and they should not be so interpreted. Amounts are in weight parts or weight percentages unless otherwise indicated.

Hypothetical Example 1

A pellet useful with the method of the present invention is prepared by admixing at a high shear rate alkyl diamine corrosion inhibitor, calcium carbonate, and a synthetic paraffin wax. The admixture is prepared and then pelletized by prilling. The pellets have a mean diameter of less than 1000 microns. The pellets have an average density of 1.026 specific gravity unit (sgu). The pellets are injected into a flowline immediately at the beginning of the pipeline. The pellets have a density and the velocity of flow of system fluids in the flowline are such that the pellets reside on or near the bottom of the flowline as they are moved along the flow line. The pellets, upon coming into contact with the brine, start to release a corrosion inhibitor thereby mitigation corrosion of the flow line by the brine.

Example 2

Pellets are prepared by admixing synthetic paraffin wax, alkyl diamine, calcium derivative and then palletizing the admixture using spray prilling. The pellets have a density of 1.026. The pellets are then tested by controlled release under accelerating conditions. The results are shown below in the Table.

TABLE

| Time (days) | Cumulative Release of Additive (cumul %) |
|---|---|
| 0 | 0 |
| 0.0 | 15.6 |
| 0.2 | 21.1 |
| 0.5 | 33.0 |
| 1.0 | 44.2 |
| 2.0 | 55.7 |
| 4.1 | 68.4 |
| 7.0 | 79.8 |
| 15.0 | 95.0 |

What is claimed is:

1. A method for treating oil field exploration and production equipment containing stagnant or slow moving system fluid with an additive, the method comprising introducing into system fluid passing through the oil field exploration and production equipment pellets incorporating the additive and having a density greater than that of the system fluid and about the same as the stagnant or slow moving system fluid, wherein the pellets are introduced into the system fluid at a point upstream of the location of the stagnant or slow moving fluid.

2. The method of claim 1 wherein the oil field and exploration equipment is a pipeline or a flowline.

3. The method of claim 1 wherein the stagnant or slow moving system fluid is water.

4. The method of claim 3 wherein the system water is brine.

5. The method of claim 1 wherein the stagnant or slow moving system fluid is a heavy hydrocarbon.

6. The method of claim 1 wherein the system fluid passes over the stagnant or slow moving system fluid.

7. The method claim 1 wherein the pellets have a density of from about 0.6 to about 1.3 g/cc.

8. The method of claim 7 wherein the pellets have a density of from about 0.75 to about 1.2 g/cc.

9. The method of claim 8 wherein the pellets have a density of from about 0.9 to about 1.1 g/cc.

10. The method of claim 1 further comprising adjusting the density of the pellets using a weighting agent selected from the group consisting of calcium sulphate, magnesium sulphate, calcium carbonate, titanium oxide, aluminum oxide, potassium chloride, sodium chloride, and mixtures thereof.

11. The method of claim 1 wherein the pellets have a major cross-sectional dimension of from about 0.2 mm to about 1.50 mm.

12. The method of claim 1 wherein the pellets have a diameter or length of from about 0.50 mm to about 1.00 mm.

13. The method of claim 1 wherein the additive is used to prevent, inhibit or mitigate: the occurrence of conditions selected from the group consisting of paraffins; asphaltenes; emulsions; corrosion; scale; foaming and mixtures thereof.

14. The method of claim 13 wherein the additive is used to prevent corrosion and is selected from the group consisting of amides, quaternary ammonium salts, rosin derivatives, amines, pyridine compounds, trithione compounds, heterocyclic sulfur compounds, alkyl mercaptans, quinoline compounds, polymers of any of these, and mixtures thereof.

15. The method of claim 13 wherein the additive is used to treat scale and is selected from the group consisting of phosphate esters, polyacrylates, phosphonates, polyacrylamides, polysulfonated polycarboxylates and mixtures thereof.

16. The method of claim 1 wherein the pellets are prepared using a formulation comprising an additive and a matrix wherein the matrix is selected from the group consisting of linear alcohols, waxes, ethoxylates, sugars, ureas, starches, and mixtures thereof.

17. The method of claim 1 wherein the pellets are an admixture of pellets prepared with different additives.

18. The method of claim 1 wherein the pellets are introduced into the formation fluid by suspending the pellets in a liquid and pumping the liquid into an annulus between a well casing and a production tubing.

19. A method for treating oil field exploration and production equipment containing stagnant or slow moving system fluid with an additive, the method comprising introducing into system fluid passing through the oil field exploration and production equipment pellets incorporating the additive and having a density greater than that of the system fluid and about the same as the stagnant or slow moving system fluid, wherein the pellets are introduced into the system fluid at a point upstream of the location of the stagnant or slow moving fluid and further comprising determining the density of the stagnant or slow moving fluid and preparing the pellets using the density of the stagnant or slow moving fluid to select the density of the pellets.

20. The method of claim 19 wherein the pellets are swept to the stagnant or slow moving system fluid and release the additive therein thereby treating the stagnant or slow moving system fluid with the additive.

* * * * *